Jan. 11, 1949.  R. P. SAUNDERS  2,458,648
PHOTOGRAPHIC ENLARGING EASEL
Filed April 4, 1946  3 Sheets-Sheet 1
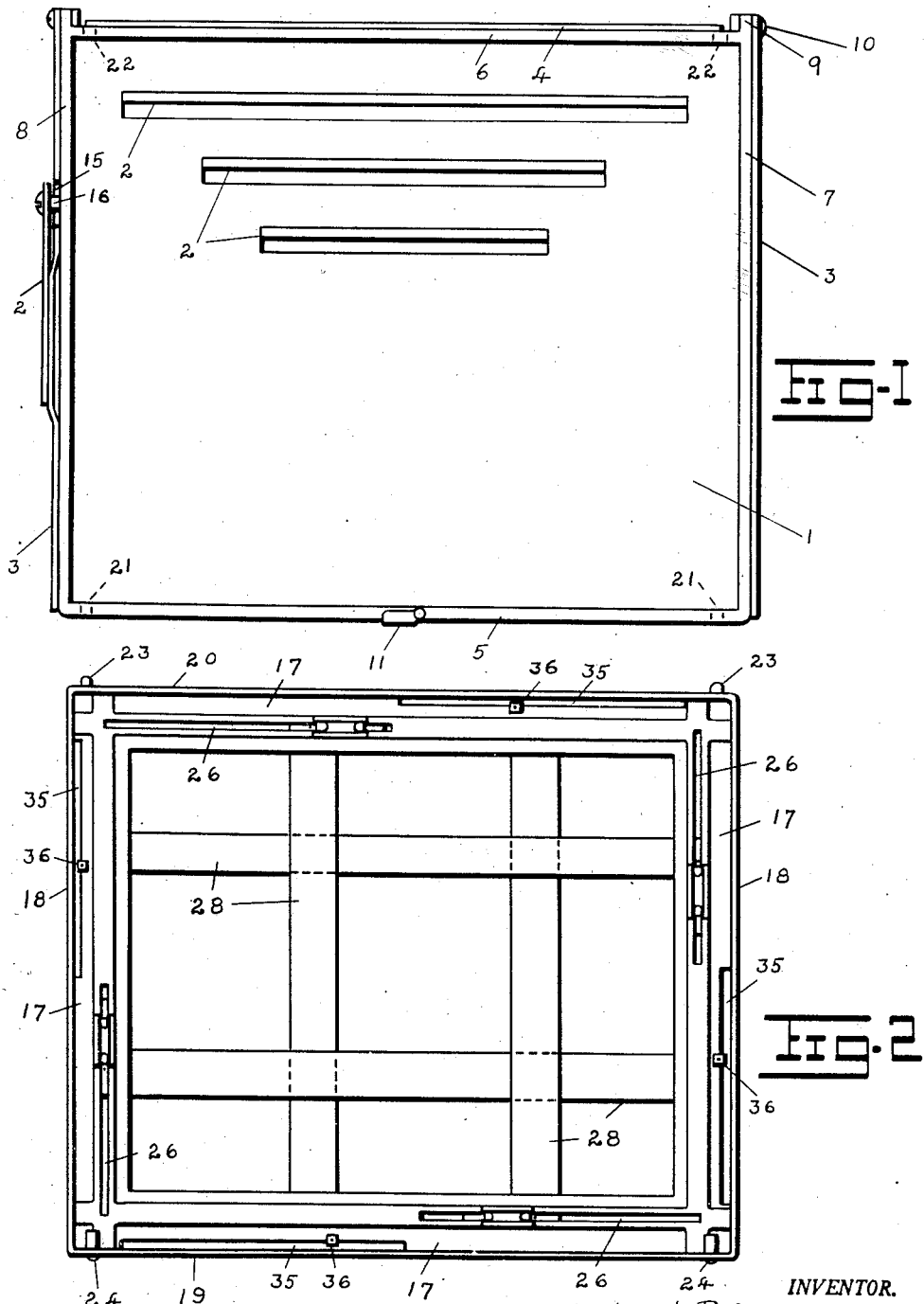
INVENTOR.
Robert P. Saunders
BY
Harold E. Stonebraker

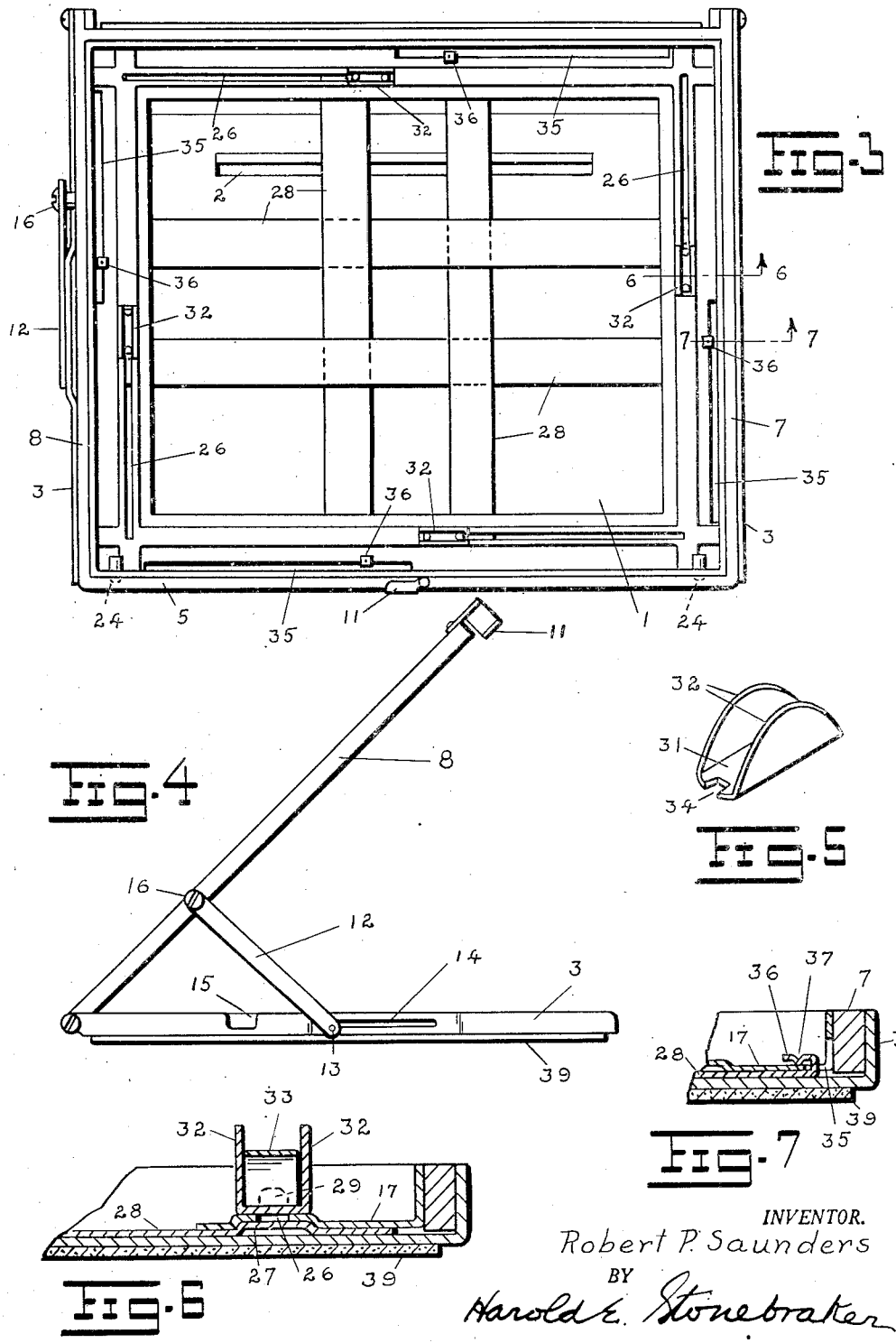

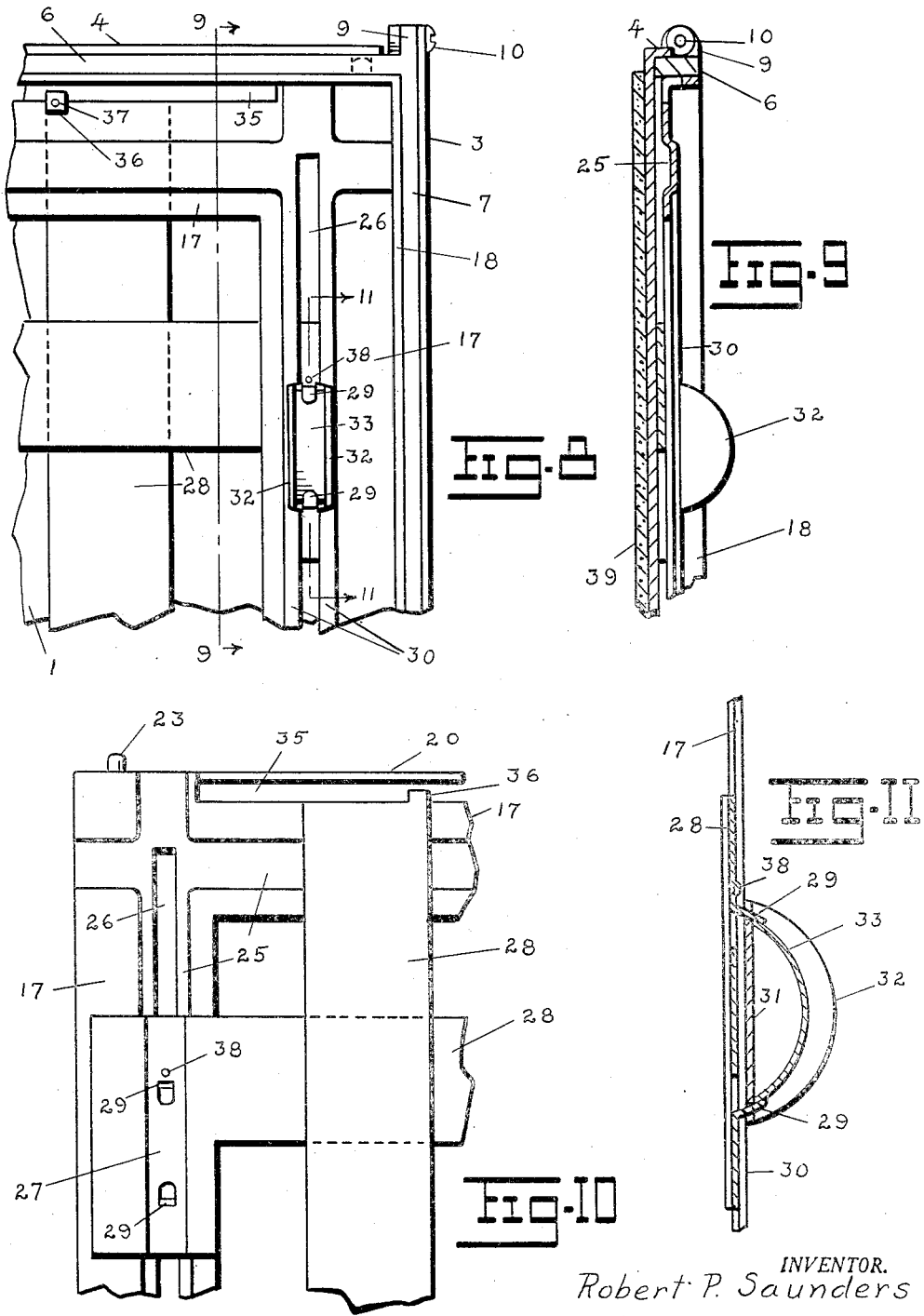

Patented Jan. 11, 1949

2,458,648

UNITED STATES PATENT OFFICE 2,458,648

PHOTOGRAPHIC ENLARGING EASEL

Robert P. Saunders, Rochester, N. Y.

Application April 4, 1946, Serial No. 659,518

17 Claims. (Cl. 88—24)

This invention relates to a photographic enlarging easel, and has for its purpose to afford a light weight structure that can be manufactured at a low cost and is adapted to various sizes of prints from 2" x 2" to as large as 14" x 17".

More particularly the invention has for its purpose to afford a photographic enlarging easel that is compact, can be easily handled, requires a minimum space on the enlarging board, and which comes within the price range of the amateur market.

Enlarging easels as heretofore constructed are of costly manufacture, heavy in weight, cumbersome and difficult to handle, and not available for large sizes except in the more expensive constructions designed only for professional use, and it is another object of the invention to provide an enlarging easel that can be used for any size print up to 14" x 17" and one in which the weight and cost are reduced to a minimum.

More particularly, the invention has for a purpose to afford an improved construction in which a retaining frame is pivotally mounted on a base plate and holds a print of maximum size, as for instance, 14" x 17", while a supporting frame is removably held within the retaining frame and carries a series of adjustable framing-blades that are positionable on the supporting frame to accommodate prints of any size, for instance from 2" x 2" up to 11" x 14".

Another object of the invention is to provide a practical, efficient, and simple structure in which a blade-supporting frame is formed of sheet metal and the framing-blades securely mounted thereon and arranged for convenient and quick adjustment by means that facilitates adjusting each blade and insures its being held in adjusted position against accidental displacement.

Still a further purpose of the invention is to afford a simple and economical arrangement that holds each adjustable framing-blade by spring-controlled means and reduces to a minimum the frictional engagement between the contacting relatively moving surfaces so as to decrease resistance and facilitate adjusting of the blades.

To these and other ends, the invention consists in the construction and arrangement of parts that will appear clearly from the following description when read in conjunction with the accompanying drawings, the novel features being pointed out in the claims following the specification.

In the drawings:

Fig. 1 is a plan view on a reduced scale of a photographic enlarging easel constructed in accordance with a preferred embodiment of the invention, showing the pivoted retaining frame in its lowered operative position on the base plate, and with the supporting frame and adjustable framing-blades removed;

Fig. 2 is a similar plan view of the supporting frame and framing-blades removed from the retaining frame;

Fig. 3 is a similar plan view showing the blade-supporting frame secured in the retaining frame and the framing-blades adjusted to accommodate a smaller print than illustrated in Fig. 2;

Fig. 4 is a view in side elevation on a reduced scale of the base plate and the pivoted retaining frame in elevated position;

Fig. 5 is a detail perspective view of one end of the operating shoes removed from its framing-blade;

Fig. 6 is an enlarged detail sectional view on line 6—6 of Fig. 3;

Fig. 7 is an enlarged detail sectional view on line 7—7 of Fig. 3;

Fig. 8 is a detail plan view of one corner of the structure as it appears in Fig. 3, somewhat enlarged;

Fig. 9 is a sectional view on line 9—9 of Fig. 8, looking in the direction indicated;

Fig. 10 is a detail rear elevation of one corner of the blade-supporting frame as it appears in Fig. 2, somewhat enlarged, and Fig. 11 is an enlarged detail sectional view on line 11—11 of Fig. 8.

Referring more particularly to the drawings in which like reference numerals throughout the several views refer to the same parts, 1 designates a base plate that is provided with a series of overhanging ledges 2 of different lengths for locating one edge of a sheet of photographic paper, depending upon the size of the print to be made, and the base plate 1 is provided with upstanding flanges 3 at its side edges and an upstanding flange 4 at its back edge, the side flanges 3 extending rearwardly somewhat beyond the back flange 4, which has its ends located in spaced relation inwardly from the side flanges 3 to accommodate the retaining frame.

The retaining frame includes a front wall 5, back wall 6, and side walls 7 and 8, which latter extend rearwardly beyond the back wall 6 to afford lugs 9 that are pivotally connected to the rear extremities of the side flanges 3 on the base plate, and thus permit the retaining frame to swing upwardly about the bolts 10 which support it on the base plate. When the retaining frame is in lowered position, the side flanges 7 and 8 lie adjacent to the side flanges 3 of the base plate, the back wall 6 of the retaining frame lies adjacent to the back flange 4 of the base plate, and the front wall 5 of the retaining frame extends along the front edge of the base plate 1.

In this position, the retaining frame will hold the maximum size sheet for which the easel is designed, namely 14" x 17", and is held in such position on the base plate by means of a catch 11 pivoted to the front wall 5 of the retaining frame and engageable under the base plate 1, as shown in Figs. 1 and 3. By swinging the catch 11 forwardly as in Fig. 4, the front portion of the retaining frame is free to move upwardly away from the base plate and can be swung about the pivots 10 to permit inserting a sheet of paper thereunder. To hold the retaining frame in elevated position, it has pivoted thereto a link 12, the lower end of which carries a pin 13 movable in a slot 14 formed in an outwardly bent portion of the adjacent side flange 3 of the base plate. The slot 14 has a depression at its rear end to receive the pin 13 when the retaining frame reaches the limit of its upward movement, the pin 13 dropping into the recess and holding the retaining frame in its elevated postion until it is released by elevating slightly the lower end of link 12 and thus releasing the pin 13 from its recess and permitting the pin and link 12 to travel forwardly in the slot 14. A recess 15 is provided in the side flange 3 of the base plate to accommodate the pivot 16 on which the link 12 is mounted, when the retaining frame is in lowered position, as in Fig. 1.

The structure thus far described is designed to accommodate one size of paper, namely, the largest size for which the structure is intended, and in order to accommodate smaller sizes of any dimensions between 2" x 2" and 11" x 14" for instance, a series of adjustable framing-blades are provided on a blade-supporting frame that is removably positionable within the retaining frame and adapted to be secured therein when any of the smaller sizes of sheets are employed and to be removed from the retaining frame when the maximum size sheet is used.

This is accomplished preferably by a blade-supporting frame including horizontal marginal walls 17 defining a rectangular central opening, upstanding side walls 18, and front and back walls 19 and 20 respectively, the framing-blades being slidably adjustable on the marginal walls 17 of the supporting frame in the manner that will be described presently. In order to position the blade-supporting frame within the retaining frame securely and permit its quick removal when desired, the retaining frame is provided with openings 21 and 22 in its front and back walls respectively, while the back wall 20 of the blade-supporting frame is provided with fixed pins 23 engageable in the openings 22 of the back wall of the retaining frame and the front wall 19 of the blade-supporting frame is provided with spring-pressed pins 24 that engage the openings 21 in the front wall of the retaining plate. The side walls and front and back walls of the blade-supporting frame fit closely within the side, front and back walls of the retaining frame, and the blade-supporting frame is inserted by first positioning the pins 23 in openings 22 and then pushing the front portion of the supporting frame downwardly until the pins 24 spring into the openings 21, and the supporting frame is thus securely held within the retaining frame.

The supporting frame is preferably inserted into the retaining frame when the retaining frame is in its horizontal position on the base plate, and to remove the supporting frame from the retaining frame, the latter is preferably elevated to its upright position, and then by pressing the forward part of the supporting frame upwardly from underneath the retaining frame sufficiently to overcome the resistance of the springs which control the pins 24, the front part of the supporting frame is elevated out of the retaining frame and the rear part can then be pulled forwardly to disengage pins 23 from openings 22 and the supporting frame lifted out. The detailed construction of the framing-blades and the means for slidably adjusting them on the supporting frame and holding them in adjusted position will now be described in detail.

Each of the horizontal marginal walls 17 supports a framing-blade that is slidably adjustable thereon, and to this end, each marginal wall 17 is provided on its undersurface with a guideway 25 provided with an elongated slot 26, and each framing-blade includes a guiding portion 27 that fits and is slidable in one of the guideways 25. Each framing-blade 28 extends over one and under another framing-blade, as indicated in Fig. 3, the blades being arranged perpendicularly to one another, and each blade slidably adjustable endwise of a guideway 25.

The adjustment of a framing-blade is limited by the slot 26, and to effect its movement, the guiding portion 27 is provided with lugs or retaining portions 29 struck upwardly therefrom and extending through the slot 26. The framing-blade is adjusted by an operating shoe movable on tracks 30 arranged on opposite sides of the slot 26 on the upper surface of the marginal wall 17, and the operating shoe comprises a bottom wall 31 engaging the tracks 30, and upstanding side walls 32 preferably with curved edges, as shown, to afford convenient finger-gripping means, while 33 designates a leaf-spring that is flexed, as shown in Fig. 11, and located between the side walls 32 with its ends engaged by the lugs or retaining members 29.

With this arrangement, the spring 33 exerts a tension on the shoe 31 and on the guiding portion 27 of the framing-blade, holding the guiding portion into its guideway 25 and holding the shoe 31 under spring tension against the tracks 30 with sufficient friction so that the framing-blade is held against accidental displacement in any position to which it is adjusted, and by gripping the side walls 32 of the operating shoe, the framing-blade can be readily adjusted endwise of the slot 26. By similarly adjusting each of the framing-blades, in accordance with any suitable indications on the supporting frame, the blades can be positioned to accommodate and retain any size sheet of paper onto which an image is to be projected. The bottom wall 31 of each shoe is recessed at its ends, as indicated at 34, and the lugs or retaining portions which engage the ends of the flexed spring 33 extend through the recesses 34 and are thus interlocked with the spring-pressed operating shoe by which the blade is manipulated for adjustment.

The structure just described supports one end of each framing-blade on the supporting frame, and in order to support the opposite or free end of each framing-blade, the marginal walls 17 are provided with slots 35 adjacent to their side walls, see Figs. 3 and 7, and each framing-blade 28 is provided at its free end with a reversely bent lug 36 that extends upwardly through the adjacent slot 35 and thence over the upper surface of the adjacent marginal wall 17, so that the free end of the blade 28 is supported on the upper surface of the marginal wall and rides thereon during adjustment. In order to facilitate movement of the framing-blade and to reduce friction between the relatively moving parts as much as possible, each lug 36 is indented at 37 to afford a bearing portion of reduced area resting on the upper surface of the marginal wall and thus reducing to a minimum the resistance offered to movement of the free end of the blade during adjustment. The slots 26 and 35 are of a length corresponding to the movement of the framing-blades, and in order to insure stoppage of each framing-blade when it has reached the limit of its outward adjustment, the guiding portion 27 is indented upwardly as indicated at 38, affording a projection that engages the end of the slot 26 and limits movement of the framing-blade, thus preventing any twisting or distorting of the blade by reason of the lug 36 striking the end of slot 35.

Such an easel is usually employed in a dark room, and it is important that it can be arranged on an enlarging board and supported without likelihood of its position being shifted. In order to accomplish this in a practical manner, the bottom of the base plate has cemented or otherwise fastened thereto a sheet or layer of anti-friction material preferably sponge rubber such as the product known as "Buna–S–#30–30," manufactured by the Sponge Rubber Products Company, Darby, Connecticut, a sheet of such material of about 1/8" thickness being cemented or otherwise fastened to the bottom of the base plate, as indicated at 39. When the device is positioned on a table or other support with the sponge rubber material 39 resting on the supporting surface, the frictional engagement of the sponge rubber sheet coupled with the weight of the enlarging easel is sufficient to prevent any slippage or other accidental movement of the easel on its support, and the structure is firmly held in proper position so that the operator may make the necessary adjustments of the framing-blades for different sizes of paper, or may remove the supporting frame from the retaining frame when the maximum size paper is to be used, without likelihood of disturbing the position of the base plate.

While the invention has been described in connection with the particular structural embodiments shown, it is not confined to the details illustrated, and this application is intended to cover such modifications or changes as may come within the purposes of the invention and the scope of the following claims.

I claim:

1. In a photographic enlarging easel, the combination with a base plate on which a sheet is positioned, of a retaining frame pivotally mounted on the base plate and positionable thereagainst to hold the sheet, a supporting frame detachably arranged within said retaining frame and positionable therewith against the base plate, and framing members adjustable on the supporting frame in a plane parallel to the base plate.

2. In a photographic enlarging easel, the combination with a base plate on which a sheet is positioned, of a retaining frame pivotally mounted on the base plate and positionable thereagainst to hold the sheet, a supporting frame arranged within the retaining frame and positionable therewith against the base plate, spring means holding the supporting frame detachably in the retaining frame, and framing members adjustable on the supporting frame in a plane parallel to the base plate.

3. In a photographic enlarging easel, the combination with a base plate on which a sheet is positioned, of a retaining frame pivotally mounted on the base plate and positionable thereagainst to hold the sheet, a blade-supporting frame detachably arranged within said retaining frame and positionable therewith against the base plate, and perpendicularly intersecting framing-blades slidably adjustable on said supporting frame endwise of one another in a plane parallel to the base plate.

4. In a photographic enlarging easel, the combination with a base plate on which a sheet is positioned, of a retaining frame pivotally mounted on the base plate and positionable thereagainst to hold the sheet, a blade-supporting frame removably arranged within said retaining frame and positionable therewith against the base plate, perpendicularly intersecting framing-blades slidably adjustable on said supporting frame endwise of one another in a plane parallel to the base plate, and spring means engaging each framing-blade and holding it frictionally in adjusted position.

5. In a photographic enlarging easel, the combination with a base plate having upstanding flanges at its side and back edges, of a retaining frame pivoted at the rear of the base plate and engaging the same at points adjacent to said side and back flanges and to its front edge, a blade-supporting frame removably arranged within said retaining frame, perpendicularly intersecting framing-blades slidably adjustable on said supporting frame endwise of one another, and spring means engaging each framing-blade and holding it frictionally in adjusted position.

6. In a photographic enlarging easel, the combination with a base plate, of a retaining frame pivotally mounted thereon, said retaining frame including front and back walls with openings therein, a blade-supporting frame fitting closely and removably secured within said retaining frame, fixed projections on the supporting frame engaging the openings in said back wall of the retaining frame, spring-actuated retaining members on the supporting frame engaging the openings in said front wall of the retaining frame, and perpendicularly intersecting framing-blades slidably adjustable on the supporting frame.

7. In a photographic enlarging easel, the combination with a base plate, of a retaining frame pivotally mounted thereon, said retaining frame including front and back walls with openings therein, a blade-supporting frame fitting closely and removably secured within said retaining frame, fixed projections on the supporting frame engaging the openings in said back wall of the retaining frame, spring-actuated retaining members on the supporting frame engaging the openings in said front wall of the retaining frame, perpendicularly intersecting framing-blades slidably adjustable on the supporting frame, and spring means engaging each blade and holding it frictionally in adjusted position.

8. In a photographic enlarging easel, the combination with a base plate, of a retaining frame pivotally mounted thereon, a blade-supporting frame removably secured within said retaining frame, said supporting frame including horizontal marginal walls having upstanding flanges at their outer edges fitting within said retaining frame, said marginal walls having guideways in their undersurfaces and elongated slots in said guideways, perpendicularly intersecting framing-blades each having a guiding portion traveling in one of said guideways and oppositely disposed retaining portions extending through said slot, tracks on the upper surfaces of the marginal wall adjacent to said slot, an operating shoe movable on said tracks, and a flexed controlling spring mounted on the shoe and held by said retaining portions of the framing-blade.

9. In a photographic enlarging easel, the combination with a base plate, of a retaining frame pivotally mounted thereon, a blade-supporting frame removably secured within said retaining frame, said supporting frame including horizontal marginal walls having upstanding flanges at their outer edges fitting within said retaining frame, said marginal walls having guideways in their undersurfaces and slots in said guideways, perpendicularly intersecting framing-blades each having a guiding portion traveling in one of said guideways and oppositely disposed retaining portions extending through said slot, tracks on the upper surface of the marginal wall adjacent to said slot, an operating shoe including a bottom wall slidable on said tracks and upstanding side walls, a flexed spring located between said side walls and engaged by the aforesaid retaining portions of the framing-blade, said bottom wall being recessed at its ends to receive the retaining portions, each of the marginal walls having a slot adjacent to its outer edge, and each framing-blade having an extension at its free end extending through the last mentioned slot and engaging the upper surface of the marginal wall.

10. In a photographic enlarging easel, the combination with a base plate, of a retaining frame pivotally mounted thereon, a blade-supporting frame removably secured within said retaining frame and including horizontal marginal walls having elongated slots therein, perpendicularly intersecting framing-blades each located and movable beneath one of said marginal walls and having oppositely disposed retaining portions extending through said slot, tracks on the upper surface of the marginal wall adjacent to said slot, an operating shoe movable on said tracks, and a flexed controlling spring mounted on the shoe and held by said retaining portions of the framing-blade.

11. In a photographic enlarging easel, the combination with a blade-supporting frame including horizontal marginal walls having guideways in their undersurfaces and slots in said guideways, of perpendicularly intersecting framing-blades each having a guiding portion traveling in one of said guideways and oppositely disposed retaining portions extending through said slot, tracks on the upper surface of the marginal wall adjacent to said slot, an operating shoe movable on said tracks and comprising a bottom wall and upstanding side walls with curved edges, and a flexed controlling spring mounted on the shoe and engaged at its ends by said retaining portions of the framing-blade, the ends of said spring resting on the shoe and held in such position by said retaining portions, the spring thereby holding the shoe and the guiding portion of the framing blade against opposite surfaces of said marginal wall.

12. In a photographic enlarging easel, the combination with a blade-supporting frame including horizontal marginal walls having elongated slots therein, of perpendicularly intersecting framing-blades each located and movable beneath one of said marginal walls, tracks on the upper surface of the marginal wall adjacent to said slot, an operating shoe movable on said tracks and comprising a bottom wall and upstanding side walls with curved edges, a flexed controlling spring mounted on the shoe, and retaining means extending from said framing-blade through said slot and engaging said spring at its ends, said ends of the spring resting on the shoe and held in such position by said retaining portions, the spring thereby holding the shoe and the guiding portion of the framing blade against opposite surfaces of said marginal wall.

13. In a photographic enlarging easel, the combination with a blade-supporting frame including horizontal marginal walls having slots therein, of perpendicularly intersecting framing-blades each supported and movable beneath one of said walls, tracks on the upper surface of said wall adjacent to the slot, an operating shoe including a bottom wall movable on said tracks and having recesses at its ends, opposite side walls having curved edges, a flexed controlling spring mounted between said side walls, and retaining means extending from the framing-blade through said slot and recesses and engaging the ends of said flexed spring.

14. In a photographic enlarging easel, the combination with a blade-supporting frame including horizontal marginal walls having slots therein, of perpendicularly intersecting framing-blades each extending over one and under another framing blade and having a guiding portion traveling along the under side of one of said marginal walls, tracks on the upper surface of said marginal wall adjacent to said slot, an operating shoe movable on said tracks and comprising a bottom wall and upstanding side walls with curved edges, a flexed spring carried by said operating shoe, retaining means extending from said guiding portion through said slot and engaging the ends of said flexed spring, each of the marginal walls having a slot adjacent to its outer edge, and each framing-blade having an extension at its free end extending through the last mentioned slot and engaging the upper surface of the marginal wall.

15. In a photographic enlarging easel, the combination with a supporting frame including horizontal marginal walls having slots therein, of perpendicularly intersecting framing-blades each located on the under side of one of said walls and having retaining means extending through said slot, tracks on the opposite side of the marginal wall adjacent to said slot, an operating shoe movable on said tracks and comprising a bottom wall and upstanding side walls with curved edges, and a flexed controlling spring supported by said operating shoe and engaged at its ends by the aforesaid retaining means, the ends of said spring resting on the shoe and held in such position by said retaining portions, the spring thereby holding the shoe and the guiding portion of the framing blade against opposite surfaces of said marginal wall.

16. In a photographic enlarging easel, the combination with a supporting frame including horizontal marginal walls having slots therein, of perpendicularly intersecting framing-blades each located on the under side of one of said walls and having retaining means extending through said slot, an operating shoe movable on the upper side of said marginal wall and comprising a bottom wall and upstanding side walls with curved edges, and a flexed controlling spring supported by said shoe and engaged at its ends by said retaining means, the ends of said spring resting on the shoe and held in such position by said retaining portions, the spring thereby holding the shoe and the guiding portion of the framing blade against opposite surfaces of said marginal wall.

17. In a photographic enlarging easel, the combination with a blade-supporting frame including horizontal marginal walls having slots therein, of perpendicularly intersecting framing-blades each supported and movable beneath one of said walls, an operating shoe including a bottom wall movable on the upper surface of one of said marginal walls, upstanding opposite side walls having curved edges, a flexed controlling spring mounted between said side walls, and retaining means extending from the framing-blade through said slot and engaging the ends of the flexed spring, the ends of said spring resting on the shoe and held in such position by said retaining portions, the spring thereby holding the shoe and the guiding portion of the framing blade against opposite surfaces of said marginal wall.

ROBERT P. SAUNDERS.

REFERENCES CITED

The following references are of record in the file of this patent:

UNITED STATES PATENTS

| Number | Name | Date |
|---|---|---|
| 1,447,444 | Thurber | Mar. 6, 1923 |
| 1,486,196 | Ruffner | Mar. 11, 1924 |
| 1,545,390 | Barron | July 7, 1925 |
| 1,745,900 | Lowen | Feb. 4, 1930 |
| 2,166,878 | Rodrigwz | July 18, 1939 |
| 2,199,304 | Dewey | Apr. 30, 1940 |
| 2,256,894 | Chadkin | Sept. 23, 1941 |